United States Patent [19]

Langseth et al.

[11] 3,911,364

[45] Oct. 7, 1975

[54] COPHASING COMBINER WITH COCHANNEL SIGNAL SELECTOR

[75] Inventors: Rollin Edward Langseth, Colts Neck; Yu Shuan Yeh, Freehold Township, Monmouth County, both of N.J.

[73] Assignee: Bell Telephone Laboratories, Incorporated, Murray Hill, N.J.

[22] Filed: May 9, 1974

[21] Appl. No.: 468,416

[52] U.S. Cl. ................. 325/301; 325/304; 325/369

[51] Int. Cl. ............................................ H04b 7/08

[58] Field of Search ............ 325/301, 320, 304–307, 325/365–369, 344–346, 349, 14, 45, 56, 30; 179/15 BP; 340/155, 185; 178/88, 67; 343/854

[56] References Cited

UNITED STATES PATENTS

| | | | |
|---|---|---|---|
| 3,175,216 | 3/1965 | Enloe | 325/14 |
| 3,471,788 | 10/1969 | Bickford et al. | 325/369 |
| 3,743,941 | 7/1973 | Gans et al. | 325/305 |

*Primary Examiner*—Robert L. Griffin
*Assistant Examiner*—Robert Hearn
*Attorney, Agent, or Firm*—David L. Hurewitz

[57] ABSTRACT

A diversity cophasing combiner is adapted to select a single signal from among a plurality of cochannel signals transmitted from different sources. The various sources transmit signals having PSK information modulation and having, in addition, pilot tag modulation uniquely associated with each source. The composite of the transmission from all sources is received by each element of a phased array antenna and applied to its associated diversity branch. The outputs of the diversity branches are combined and the combined output is processed to select one tag and produce a loop signal uniquely identified by the one selected tag. The processing is arranged so that when this loop signal is mixed with each branch input, the upper sideband product of the loop signal and the one received signal having the selected tag contains a distinctive cophasing phase angle, but it is stripped of information and tagging modulation. Any unselected received signal produces a product containing some unremoved information or tagging modulation and it is therefore distinguishable. Only the one modulation-free product derived from the received signal having the selected tag is mixed with the total branch input to yield the cophased branch output, and thus only the transmission having the selected tag contributes to the cophased combined output.

12 Claims, 1 Drawing Figure

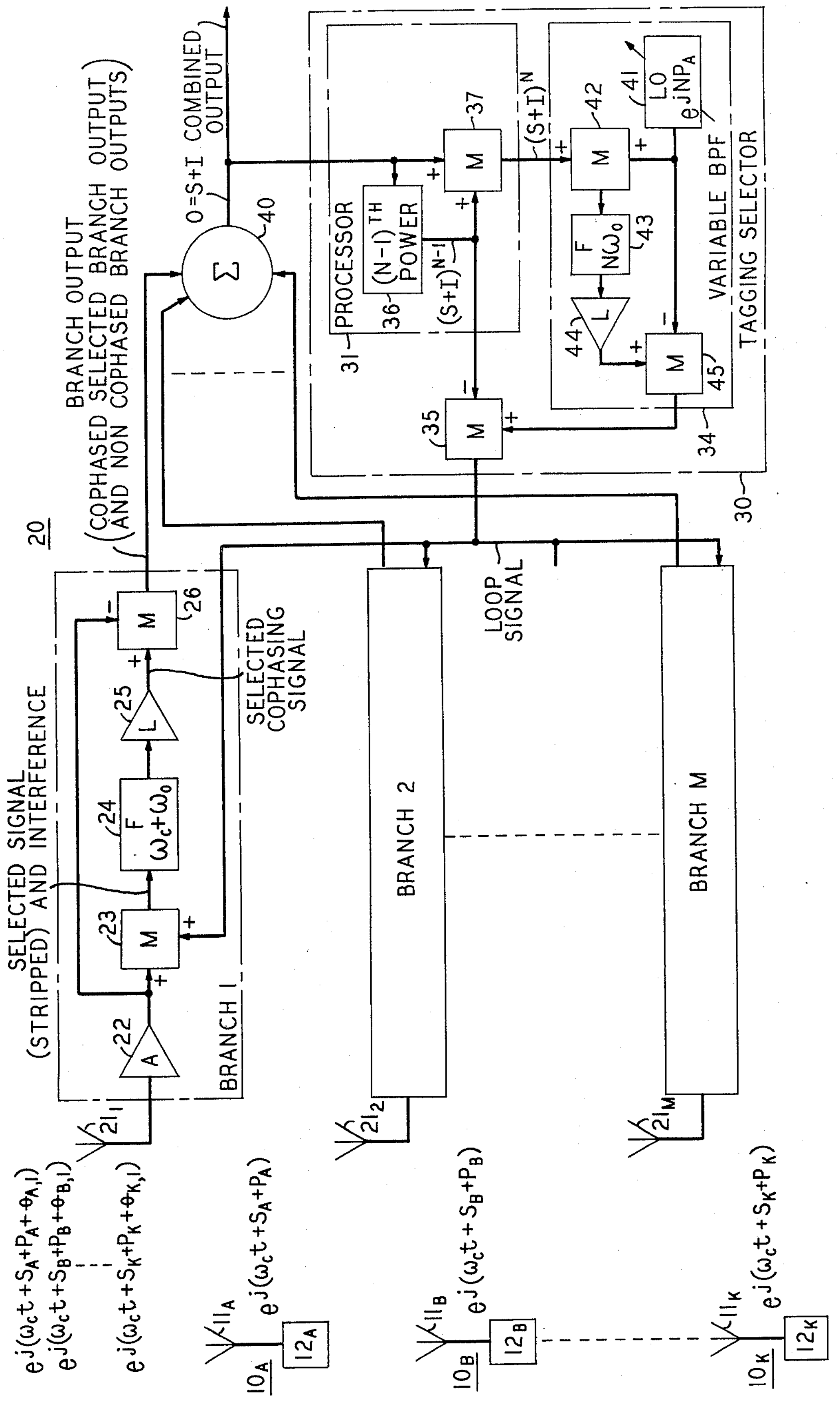
20
BRANCH OUTPUT (COPHASED SELECTED BRANCH OUTPUT AND NON COPHASED BRANCH OUTPUTS)
O=S+I COMBINED OUTPUT
SELECTED SIGNAL (STRIPPED) AND INTERFERENCE
SELECTED COPHASING SIGNAL
BRANCH 1
BRANCH 2
BRANCH M
LOOP SIGNAL
PROCESSOR
(N-1)TH POWER
VARIABLE BPF
TAGGING SELECTOR
LO

COPHASING COMBINER WITH COCHANNEL SIGNAL SELECTOR

BACKGROUND OF THE INVENTION

Phased arrays are often employed to gain the advantages associated with diversity and beam steering. When used at a receiver a phased array antenna receives a plurality of inputs, each having a distinct phase angle, and the receiver cophases this plurality of inputs to produce a combined output superior to any one of the inputs. By cophasing, the receiver effectively "steers" the receiving array toward the source of the transmission, and the cophaser may also generate phase information which can be used to direct transmission (conjugate phase retransmission) back toward the source. One cophasing arrangement known as the Granlund combiner mixes the combined output with the input of each branch to eliminate or strip the intelligence and then this stripped signal is mixed with each branch input to eliminate the distinctive phase angle associated with the branch. The Granlund combiner reported initially in "Topics in the Design of Antennas for Scatter" by John Granlund, MIT Lincoln Lab Technical Report No. 135, Nov. 23, 1956, functions with any form of modulation.

In certain systems using phased array antennas, it may be necessary to conserve carrier frequencies by reusing them at the same location. In particular, this is anticipated for satellite communication systems in which differently directed beams, occupying a common frequency band, would be received at one antenna array. However, if a phased array were illuminated by a plurality of beams at the same frequency, a conventional diversity receiver could not select among the different sources of transmission since the common frequency signals, referred to herein as cochannel signals, would be indistinguishable. In fact, a Granlund type combiner could not cophase a selected one of these cochannel signals since it would inherently lock-on the strongest of them, rather than any specifically chosen one.

It is the object of the present invention to permit the use of phased array antennas and diversity combining techniques in the presence of cochannel signals originating from different sources.

In particular, it is an object of the invention to select one signal from among a plurality of cochannel signals arriving at a diversity receiver from different directions and to produce a cophased combined output of the one selected signal.

SUMMARY OF THE INVENTION

In accordance with the present invention a diversity combiner is adapted to cophase only those inputs originating at a single selected source, even though weaker or stronger cochannel signals from a different source are present. The successful selection of one cochannel signal is made possible by two factors. Transmission at each source utilizes phase-shift keying (PSK) for intelligence modulation and additionally the carrier is modulated with a pilot tag distinctive for the transmission of each individual source.

The combiner receives the output from each diversity branch and the combined output is processed to produce a loop signal uniquely identified by the one unique tag corresponding to a selected source. The processing is arranged so that when this loop signal is mixed with each branch input, the upper sideband product of the loop signal and the one selected input contains the phase information associated with the selected input received at that branch, but contains neither pilot tagging nor (due to the PSK format) intelligence modulation. However, any signal from another source will yield a product containing some intelligence modulation or tagging information. Accordingly, narrowband filtering is used to remove products produced by such undesired sources and the remaining product, having phase information associated with the selected input, is then used as a cophasing signal. It is mixed with the branch input to produce a branch output containing the selected signal cophased with the corresponding signals produced on other branches. The various branch outputs are added to produce the cophased combined output.

The combiner cophases the signal having one selected tag in the presence of signals having other distinctive tags or no tags at all. This combiner is therefore well suited for use in many communication systems requiring reception of a specific transmission in the presence of cochannel interference whether the interference is derived from alternative sources within the system or from sources outside the system. For example, a satellite including the combiner could selectively receive a signal from one earth station while being illuminated by a beam of the same frequency from another earth station. Conversely, earth stations having the combiner could be illuminated by beams from a number of satellites and could selectively receive from one of them.

BRIEF DESCRIPTION OF THE DRAWING

The drawing is a block diagram of a transmission system including a plurality of sources and a selective cophasing combiner in accordance with the present invention.

DETAILED DESCRIPTION

In the drawing a plurality of remotely located sources $10_A$, $10_B$, . . ., $10_K$, each consisting of an antenna 11 and transmitter 12, transmit individualized signals which are all received by an antenna array of receiver 20. The output of each source 10 may be characterized by its carrier frequency $\omega_c$, which is common to all transmissions, its information modulation $S_k$, and its pilot modulation $P_k$. The information modulation and pilot modulation are distinct for each transmitter, and the subscript $k$ corresponds to the source A,B, . . .,K. By conventional notation the transmitted output from the $k^{th}$ transmitting station ($10_k$) can be designated $$e^{j(\omega_c t+S_k+P_k)}, \qquad (1)$$

where $k$ = A,B, . . .,K.

The individual signals radiated from antennas 11 will arrive collectively at the array of receiver 20. Each antenna of the array, such as antenna $21_1$, of branch 1, will receive all of the transmissions. The signal from each source 10 will have a common carrier frequency $\omega_c$, but they will contain different information modulation $S_k$ and different pilot modulation (or tagging) $P_k$. In addition, each transmission will arrive at each individual antenna of the array from a different direction and will therefore have a different relative phase angle $\theta_{k,m}$, where $m$ = 1,2, . . .,M, corresponding to the branch associated with the specific receiving antenna. The designation $\theta_{A,2}$ indicates, for example, the phase angle associated with transmission from source $10_A$ as received at receiving antenna $21_2$ of branch 2.

In general, the reception at antenna $21_m$ (corresponding to the $m^{th}$ branch of receiver 20) will be $$\sum_{k=A.}^{K} e^{j(\omega_c t+S_k+P_k+\theta_{k,m})},\ m=1,2,\ldots,M \quad (2)$$

Since each branch 1 through M is identical in structure and function, only representative branch 1 will be described and its total branch input consisting of the plurality of received signals ($k$ = A,B, . . .,K) for that branch (that is, where $m = 1$) is indicated at antenna $21_1$.

As will be discussed below, the output of each branch will contain the cophased selected signal. It is applied to combiner 40 in which it is algebraically added to the cophased outputs of all other branches to produce the combined cophased selected output. The branch outputs also contain noncophased signals which contribute to the combined output, but they are, of course, not cophased. The entire combined output is monitored by tagging selector 30 which produces a loop signal uniquely identifying one selected tag. This loop signal, which contains a component derived from the information modulation of the selected transmission and a component derived from the corresponding pilot (tagging) modulation of the selected transmission, is applied to each branch where it is mixed with the total branch input. The tagging selector 30 produces the loop signal which is preconditioned so that this mixing, such as in mixer 23 of branch 1, produces one term of the upper sideband product having neither pilot tagging nor information modulation, but containing the phase angle associated with the selected reception as received at the one particular branch antenna. In addition to this modulation-stripped version of the selected signal, other terms of the upper sideband product derived from other parts of the total branch input, will be produced. However, each of these terms contains either tagging modulation, information modulation or both and they are removed by filter 24. The modulation-stripped selected signal is mixed in mixer 26 with the total branch input to form a lower sideband product, but only the reception from the selected source will have its phase angle $\theta$ cancelled by this process and thus only this selected signal will contribute to the cophased branch output. Of course, other products of mixer 26 exist, but they are noncophased.

To fully understand the operation of the receiver 20 and the tagging selector 30, in particular, an illustrative example will be discussed in which source $10_A$ ($k$ = A) is the selected source. Of course, this is merely an arbitrarily chosen example and any of the sources could be selected, but where $10_A$ is the selected source, tagging selector 30 is adjusted so that the loop signal is uniquely identified by the pilot modulation $P_A$. Then the reception on branch 1 having the pilot tag $P_A$ is cophased by cancellation of the corresponding phase angle $\theta_{A,1}$.

The information modulation $S_A$ is applied at transmitter $12_A$ by phase shift keying. The pilot modulation $P_A$, which serves as a tag, uniquely identifying originating source $10_A$ is assumed to be a linear phase shift (frequency offset), although it may be of many other forms, such as pseudorandom phase shift modulation.

The total branch input for branch 1 is from Expression (2):

$$\sum_{k=A.}^{K} e^{j(\omega_c t+S_k+P_k+\theta_{k,1})} \quad (3)$$

It may also be expressed as the combination of the selected signal and interference; the branch 1 selected signal being $$e^{j(\omega_c t+S_A+P_A+\theta_{k,1})} \quad (4)$$

and the branch 1 interference being $$\sum_{k=B.}^{K} e^{j(\omega_c t+S_k+P_k+\theta_{k,1})} \quad (5)$$

For purposes of discussion it will first be assumed that receiver 20 has previously locked onto and cophased with the signal from selected source $10_A$. Thus, the $M$ selected branch outputs are combined coherently to produce $S$, the combined selected cophased signal:

$$S = Me^{j(\omega_o t-S_A-P_A)} \quad (6)$$

and the interference from $M$ branches combines incoherently to form $I$, the combined interference:

$$I = \sum_{K=B}^{K} E_{kA}\, e^{j(\omega_o t-S_k-P_k)} \quad (7)$$

where $\omega_o$ is the output frequency not equal to $\omega_c$, and where $E_{kA}$ represents the complex amplitude of the reception from the $k^{th}$ source when the receiver is cophased to another source $10_A$. For completeness, it is noted that $$E_{kA} = \sum_{m=1}^{M} e^{-j(\theta_{km}-\theta_{Am})} \quad (8)$$

The interference is noncophased and contains random relative phase angles as part of $E_{kA}$, although no relative phase angle $\theta$ appears in the selected signal $S$.

The combined output, designated $O$, is the sum of $S$ and $I$:

$$O = S + I. \quad (9)$$

This output $O$ is monitored and applied to tagging selector 30. The selector contains a variable bandpass filter 34 which insures that the loop signal will contain the unique tag $P_A$ associated with the selected source, but first, processor 31 prepares the monitored output for filtering and removes the N-phase PSK modulation from the principal terms of the input to filter 34. A power device 36 which mathematically takes the $(N-1)$th power of its input operates on the monitored output O to yield $$(S+I)^{N-1} = \Big[ M e^{j(\omega_o t - S_A - P_A)} + \sum_{k=B}^{K} E_{kA}\, e^{j(\omega_o t - S_k - P_k)} \Big]^{N-1}$$

$$= M^{N-1} e^{j(N-1)(\omega_o t - S_A - P_A)} + \sum_{k=B}^{K} E_{kA}^{N-1} e^{j(N-1)(\omega_o t - S_k - P_k)} + \text{crossterms}, \qquad (10)$$

The first term of Equation (10) is the "principal signal term;" it contains only the selected signal raised to a power. The second term of Equation (10) is the "principall interference term;" it is the summation of the individual interference terms, each raised to a power. The crossterms are the products of the signal term and interference terms or the products of different interference terms.

Power device 36 can be formed by an appropriate combination of mixers. For two-phase PSK the device reduces to a direct connection since $N - 1 = 1$. For four-phase PSK it is a cubic law device (using, for example, two mixers).

The monitored output $O$ is then combined by mixer 37 with the output of power device 36 to produce the upper sideband product:

$$(S+I)(S+I)^{N-1} = (S+I)^N = M^N e^{jN(\omega_o t - S_A - P_A)} + \sum_{k=B}^{K} E_{kA}^{N} e^{jN(\omega_o t - S_k - P_k)} + \text{crossterms}, \qquad (11)$$

where the crossterms are again the products of the signal term and interference terms or the products of different interference terms.

It is noted that the signal modulation in the principal signal (or first) term and the principal interference (or second) term of Equation (11) has actually been eliminated by virtue of the PSK format since $$e^{-j(NS_K)} = 1,\ k = A, B, \ldots, K \qquad (12)$$

for N-phase PSK, where $$S_k = 2L\pi/N,\ L = 0, 1, \ldots, N-1 \qquad (13)$$

Therefore, as can be seen from Equation (11), the principal signal term is a *cw* signal centered at the frequency $N(\omega_o - \dot{P}_A)$, where $\dot{P}_A$ is the time derivatiive of $P_A$. The principal interference term is a summation of cw signals, each of which is centered at $N(\omega_o - \dot{P}_k)$; thus, each term of the summation is at a frequency offset from all others and from the principal signal term. The crossterms are all signals having wideband modulation.

Therefore, if the output from mixer 37 is filtered to pass only the frequency $N(\omega_o - \dot{P}_A)$, then both the principal interference term and the crossterms will be eliminated. Accordingly, the output of mixer 37, $(S+I)^N$, is applied to variable bandpass filter 34 which acts to reject all the wideband crossterms and all cw signals except the one desired cw signal derived exclusively from the principal signal term having a center frequency $N(\omega_o - \dot{P}_A)$. It is noted that instead of selecting source $\mathbf{10}_A$ another source could be selected simply by changing the passband of the filter to pass the frequency $N(\omega_o - \dot{P}_k)$.

Bandpass filter 34 may be embodied by many well-known structures including the feedforward frequency shift loop shown. In this embodiment, local oscillator 41 is tuned to a frequency $N$ times the selected tag offset and is then locked by means of a loop consisting of mixer 42, fixed narrowband filter 43, limiting amplifier 44 and mixer 45 to produce the desired passband. This specific arrangement creates a variable bandpass filter from the fixed narrowband filter 43 centered at $N\omega_o$ by using the mixers 42 and 45 to shift the input signal frequency under control of local oscillator 41. This effectively moves the input frequency to the frequency of the fixed filter and then returns the filtered result to its original center frequency.

Thus, to establish the passband of $N(\omega_o - \dot{P}_A)$ using the filter 43 centered at $N\omega_o$, the local oscillator 41 will be tuned to produce $e^{j(NP_A)}$. When this is combined in mixer 42 with the output of mixer 37, the upper sideband product is a signal whose principal signal term is at the center frequency $N\omega_o$ (the $NP_A$ term having been cancelled). The additional terms are the interference terms and the wideband crossterms of Equation (11) shifted by $NP_A$. Accordingly, only the principal signal term $M^N e^{jN\omega_o t}$ will pass filter 43 and be amplified by limiting amplifier 44. Mixer 45 recombines the amplified cw signal with the local oscillator output to shift the limited signal back to its original frequency of $N(\omega_o - P_A)$. Due to limiting amplifier 44 the output of filter 34 will conveniently be of unity amplitude:

$$e^{jN(\omega_o t - P_A)}. \qquad (14)$$

Mixer 35 combines the output from power device 36 (Equation 10) with this output from variable bandpass filter 34 to form the lower sideband product. This product is the loop signal, which is a mathematically frequency shifted and inverted form of the $(N-1)$th power of the combined output O. The loop signal may be represented as $$M^{N-1}\left[e^{j\omega_o t + (N-1)S_A - P_A}\right] + \sum_{k=B}^{K} E_{kA}^{*\,N-1} e^{j[\omega_o t + (N-1)S_k - NP_A + (N-1)P_k]} + \text{crossterms} \qquad (15)$$

where $E_{kA}^*$ is the complex conjugate of $E_{kA}$. The loop signal uniquely identifies the one selected source by the phase $-P_A$ in its principal signal term. The principal interference term is a summation of signals, each identified by a distinct tagging modulation $P_k$. The remaining terms are wideband crossterms. The function of this loop signal is to provide a preconditioned feedback signal which may be used in each branch to selectively cophase the signal from the selected source $\mathbf{10}_A$.

The total branch input received by the antenna $\mathbf{21}_1$ is set forth in Expressions (4) and (5). This input is amplified by amplifier 22 and then divided into two parts.

One part is applied to mixer 23 where it is combined with the loop signal from tagging selector 30 which, as discussed previously, has been adjusted to select the specific tag assumed here to be $P_A$. Ignoring the gain of amplifier 22, the upper sideband output of mixer 23 is $$M^{N-1} e^{j[(\omega_c+\omega_o)t+\theta_{A,1}]} + \sum_{k=B}^{K} E_{kA}{}^{*N-1} e^{j[(\omega_c+\omega_o)t+NP_k-NP_A+\theta_{k,1}]} + \text{crossterms.} \quad (16)$$

The first term is the principal signal term. The second term is the principal interference term and the crossterms are the products of the signal term and interference terms or the products of different interference terms. The principal signal term is a cw signal centered at $\omega_o + \omega_c$ and as can be seen it is modulation-free, since the mixing strips both the signal and tagging modulation. The tagging modulation is cancelled by the $-P_A$ phase in the loop signal and due to the PSK modulation format, the signal modulation in the upper sideband product will be reduced to unity as discussed with regard to Equations (12) and (13). The principal interference term is a summation of *cw* signals (the PSK modulation being reduced to unity), each having appropriate cophasing information but each being frequency offset from $\omega_c + \omega_o$ by a distinctive amount due to tagging. The crossterms are signals containing wideband modulation.

The output of mixer 23 is applied to fixed narrowband filter 24 which is centered at $\omega_o + \omega_c$. This passes only the principal signal term since all other terms are either wideband or cw signals having residual tagging modulation which places them outside the passband of filter 24.

Therefore, the output of filter 24 (input to limiter 25) is substantially the principal signal term of Equation (16). It is a cw signal centered at $(\omega_c + \omega_o)$ and having cophasing information $(\theta_{A,1})$. After passing through limiter 25, which conveniently produces a unity amplitude, the limited signal is applied to mixer 26 where it serves as a cophasing signal. In mixer 26 it is combined with the other part of the total branch input from amplifier 22 to yield the lower sideband product which contains the cophased selected branch output and numerous noncophased outputs. The branch output from mixer 26 is $$e^{j(\omega_o t-S_A-P_A)} + \sum_{k=B}^{K} e^{j[\omega_o t-S_k-P_k+\theta_{A,1}-\theta_{k,1}]} \quad (17)$$

where the first term is the selected cophased output of branch 1 and the second term is the summation of the non-cophased interference signals on branch 1. This cophased branch output is combined with similar cophased branch outputs from the other branches in linear combiner 40. The noncophased outputs, derived from other sources are also combined, along with the cophased branch outputs in combiner 40 to produce the combined output, $O = S + I$, as was assumed. See Equations (6), (7), (8) and (9).

In addition, the presence of the noncophased signals do not adversely affect the tagging selection process. Of course, if another source were selected, the bandpass filter 34 would be appropriately adjusted, such as by tuning local oscillator 41 to a frequency corresponding to $N$ times the tagged offset of the newly selected source. The selection and combining processes would then operate as previously described to cophase only the received signals from the newly selected source.

In certain transmission systems interference could be expected from sources outside the system. Since these sources would not provide the selected tagging, the combiner will not cophase them unless the received signals accidentally have the same effective format as the selected signal.

It was first assumed that the combiner had previously cophased from source $\mathbf{10}_A$. Of course, if the receiver were previously off, the output of combiner 40 would contain both $S$ and $I$ when initially turned on, but since cophasing has not previously occurred, the relative strengths of $S$ and $I$ are arbitrary and the output of filter 24 is randomly phased. Nevertheless, the selection process taking place in selector 30 will still tend to produce the selected *cw* signal, since all other signals will be rejected by filter 43 regardless of strength. Similarly, only the component of the loop signal from the desired source contributes to a *cw* signal within the passband of filter 24 while undesired signals, which do produce *cw* signals (even if stronger than the desired one), would not pass filter 24. Accordingly, filter 24 effectively attenuates all nonselected signals and, therefore, increases the contribution of the desired signal in its output. Over a period of time, operation of the overall loop would pull the output of filter 24 to the phase required to cophase only the desired signal. Thus, the array will lock up to any selected source in accordance with the selected tag and will track the selected source unless the tag selection is changed.

It was assumed in Equation (7) that $\omega_o$ was the output frequency, but in fact, the only predetermined frequencies in the system are the input carrier frequency $\omega_c$ and the fixed center frequencies of filters 43 and 44. It is required, of course, that the frequency and phase around the loop be self-consistent. The consistency of the information and pilot tagging modulation has been included in the previous discussion, and it may be shown that $\omega_o$ will be internally created with frequency and phase consistency.

The filter 24 has a fixed center frequency which may be designated $\omega_1$. For $\omega_c + \omega_o$ to pass through filter 24:

$$\omega_1 = \omega_c + \omega_o \pm \tfrac{1}{2}\, \Delta\omega_1 \quad (18)$$

where $\Delta\omega_1$ is the half power bandwidth of filter 24; and therefore $$\omega_o = (\omega_1 - \omega_c) \pm \tfrac{1}{2}\, \Delta\omega_1. \quad (19)$$

The center frequency of filter 43 is $N(\omega_1 - \omega_c)$ and has been shown nominally as $N\omega_o$. By assuming the phase of the loop signal to be $\omega_o t + \alpha$, analysis of the signal progression around the loop will yield another expression for the phase of the loop signal which is $$\omega_o t + \alpha - \omega_o(\tau_1 + N\tau_2) - \omega_c\tau_1 \quad (20)$$

where $\tau_1$ and $\tau_2$ are delays in filter 24 and 43, respectively.

For phase consistency of the loop signal $$\omega_o t + \alpha = \omega_o t + \alpha - \omega_o(\tau_1 + N\tau_2) - \omega_c\tau_1 + 2n\pi \quad (21)$$

where $n$ is an integer. Thus, $$\omega_o(\tau_1 + N\tau_2) + \omega_c\tau_1 = 2n\pi. \quad (22)$$

Therefore, phase consistency exists only if $\omega_o$ satisfies the conditions of Equation (22). If $\omega_o$ is at its nominal value, $\omega_c + \omega_o$ is at the center frequency of filter 24 and $N\omega_o$ is at the center frequency of filter 43. However, the drift of $\omega_o$ within the respective passbands of filters 24 and 43 is inherently sufficient to provide the phase shift needed to satisfy Equation (22) and the loop will thus create a phase and frequency consistent $\omega_o$ which will drift from its nominal value only within the passband of the fixed filters 24 and 43.

It is noted that the above description assumed $P_A$ was a frequency offset form of modulation. If another form of tagging were employed, such as a pseudorandom code, the only significant change would involve modification of the local oscillator so that when its output is mixed with the selected signal it would produce a cw signal which would pass filter 43. Therefore, the phase shift $P_k$ due to the pseudorandom tagging modulation must satisfy:

$$e^{j2NP_K} = 1. \quad (23)$$

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

We claim:

1. A transmission system comprising, a plurality of spaced transmitting sources, each source transmitting a signal at a common carrier frequency but having PSK information modulation and pilot tag modulation uniquely associated with that source, and a diversity receiver having a plurality of branches, the receiver including means in each of the branches for receiving a branch input consisting of all of the signals transmitted from the plurality of sources, means for combining the outputs of each branch to produce a combined output, means for operating on the combined output to select the one unique pilot tag modulation associated with a selected source and produce a loop signal uniquely identified by the selected one unique pilot tag modulation, means in each of the branches for combining the loop signal with the branch input to produce the branch output, a portion of said branch output being derived from the one signal of the branch input having the one selected unique pilot tag modulation exclusive of all other signals of the branch input, said portion being cophased with the corresponding portion of each other branch output derived exclusively from the selected source.

2. A transmission system as claimed in claim 1 wherein means for combining the loop signal with the branch input includes means for mixing the loop signal and the branch input to produce a summation of the upper sideband products, the one product derived from the signal of the branch input having the one selected tag being uniquely distinguishable from all other upper sideband products by the absence of both information modulation and pilot tagging information, narrowband filter means for separating the desired product from all other sideband products, and means for mixing the desired product with the branch input to produce the branch output having a cophased portion derived exclusively from the one signal of the branch input having the one selected pilot tag modulation.

3. A transmission system as claimed in claim 1 wherein one of the plurality of sources provides no pilot tag modulation, its transmission being uniquely identified by the lack of a pilot tag modulation, and the means for operating on the combined output is arranged to select a pilot tag modulation associated with another of the plurality of sources.

4. A transmission system as claimed in claim 1 wherein said means for operating on the combined output to produce a loop signal includes means for processing the combined output to remove the PSK information modulation, a variable bandpass filter to which the output of the processing means is applied, the passband of the filter being selectively variable to pass a signal having a frequency identifying the one selected pilot tag modulation to the exclusion of all other signals having other pilot tag modulations, and mixing means for generating from the filtered signal the loop signal uniquely identified by the one selected pilot tag modulation.

5. A transmission system as claimed in claim 4 wherein the pilot tag modulation is by linear phase shift which produces a frequency offset, and the processing means raises the combined output to the $N$th power, where $N$ is the phase of the PSK modulation, the output raised to the $N$th power containing a *cw* signal having no information modulation, but having a frequency component $N$ times the one selected pilot tag modulation.

6. A transmission system as claimed in claim 5 wherein the bandpass filter passes only the *cw* signal having no information modulation, but having a frequency component N times the one selected pilot tag modulation.

7. In a diversity receiver having a plurality of branches and being responsive to transmissions from a plurality of spaced transmitting sources, each source transmitting a signal having a common carrier frequency with PSK information modulation and pilot tag modulation uniquely associated with that source, cophasing apparatus comprising, means for combining the output of each branch to produce a combined output containing a cophased selected portion, and means for preconditioning the combined output to produce a loop signal uniquely identified by one selected pilot tag, each of the branches including:

means for receiving as a branch input each of the pilot tag modulated transmissions, means for fixing the loop signal with the branch input to produce a combination of upper sideband products, the one product derived from the part of the branch input having the selected tag modulation being uniquely distinguishable from all other upper sideband products by the absence of both information modulation and pilot tag modulation, narrowband filter means for separating the one product from all other upper sideband products, and means for mixing the desired product with the branch input to produce the branch output for application to the combining means.

8. In a diversity receiver cophasing apparatus as claimed in claim 7 wherein one of the plurality of sources provides no pilot tag modulation, its transmission being uniquely identified by the lack of a pilot tag modulation, and the means for preconditioning the combined output is adapted to select a pilot tag modulation associated with another of the sources.

9. In a diversity receiver cophasing apparatus as claimed in claim 7 wherein the means for preconditioning the combined output includes means for processing the combined output to remove the PSK information modulation, a variable bandpass filter to which the output of the processing means is applied, the passband of the filter being selectively variable to pass a signal having a frequency identifying the one selected pilot tag to the exclusion of all other pilot tags, and mixing means for generating from the filtered signal the loop signal uniquely identified by the one selected pilot tag.

10. In a diversity receiver, cophasing apparatus as claimed in claim 9 wherein the pilot tag modulation is by linear phase shift which produces a frequency offset, and the processing means raises the combined output to the *N*th power, where *N* is the phase of the PSK modulation, the output raised to the *N*th power containing a cw signal having no information modulation, but having a frequency component *N* times the one selected pilot tag.

11. In a diversity receiver, cophasing apparatus as claimed in claim 9 wherein the bandpass filter passes only the cw signal having no information modulation, but having a frequency component *N* times the one selected pilot tag.

12. A diversity cophasing receiver of the type having a plurality of branches, means for combining the branch outputs to produce a combined output, feedback means for applying a loop signal derived from the combined output to the individual branches to produce a cophasing signal within each branch, means for combining the cophasing signal with the branch input to produce a cophased branch output, characterized in that the receiver is responsive to transmissions from a plurality of spaced transmitting sources, each source transmitting a signal having a common carrier frequency with PSK information modulation and pilot tag modulation uniquely associated with that source, and the feedback means includes means for processing the combined output to remove the PSK information modulation, a variable bandpass filter to which the output of the processing means is applied, the passband of the filter being selectively variable to pass a signal having a frequency identifying the one selected pilot tag modulation to the exclusion of all other signals having other pilot tag modulations, and mixing means for generating from the filtered signal the loop signal uniquely identified by the one selected pilot tag modulation.

* * * * *